United States Patent Office 3,737,383
Patented June 5, 1973

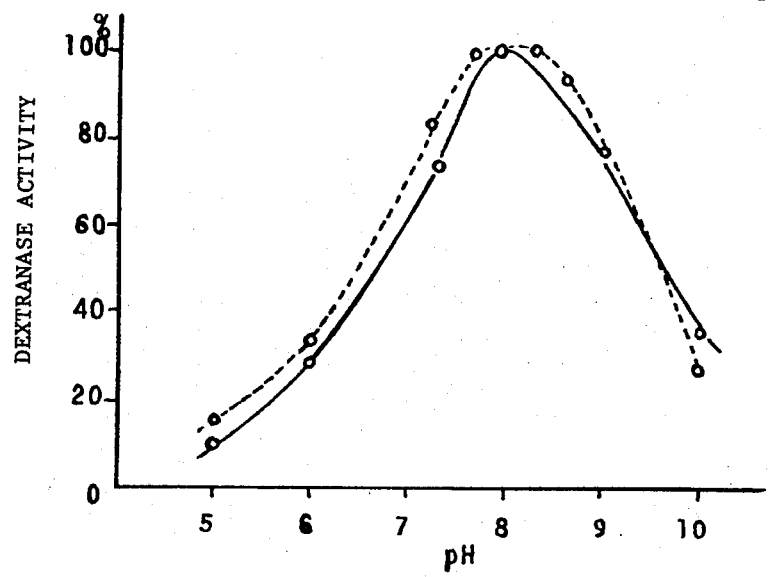
Fig. 1 OPTIMUM pH
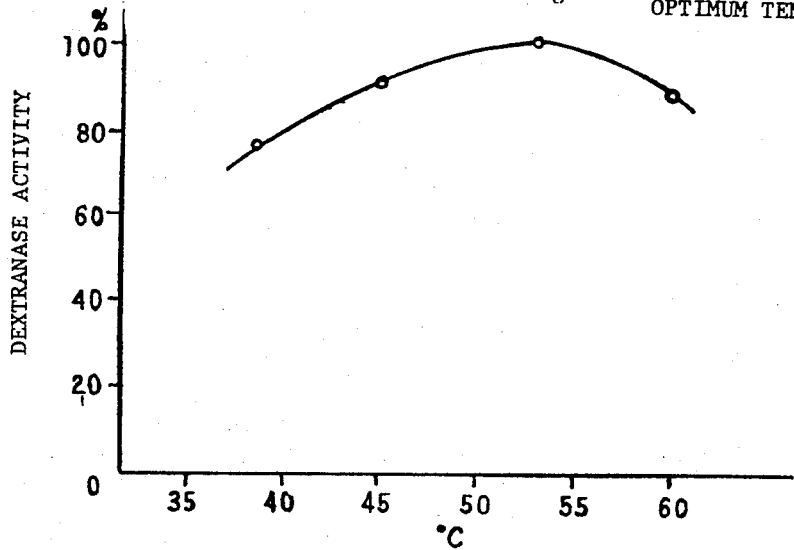
Fig. 2 OPTIMUM TEMPERATURE

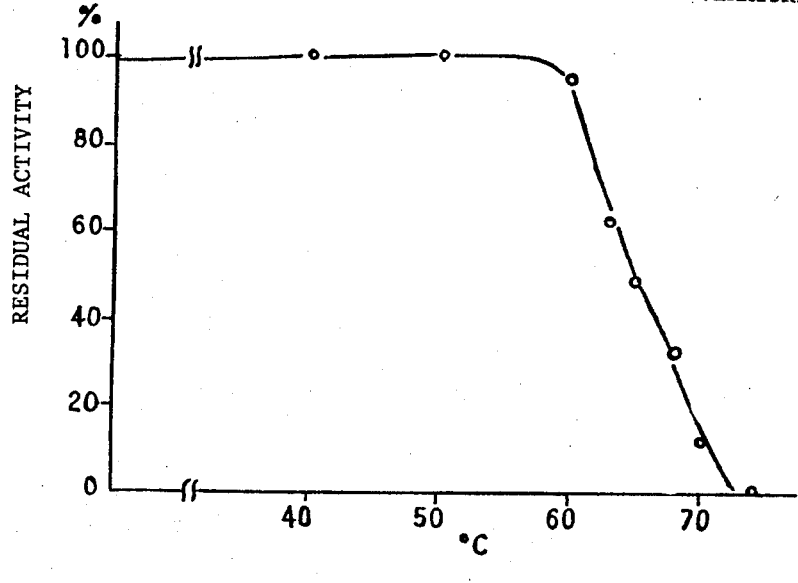
Fig. 3 TEMPERATURE STABILITY
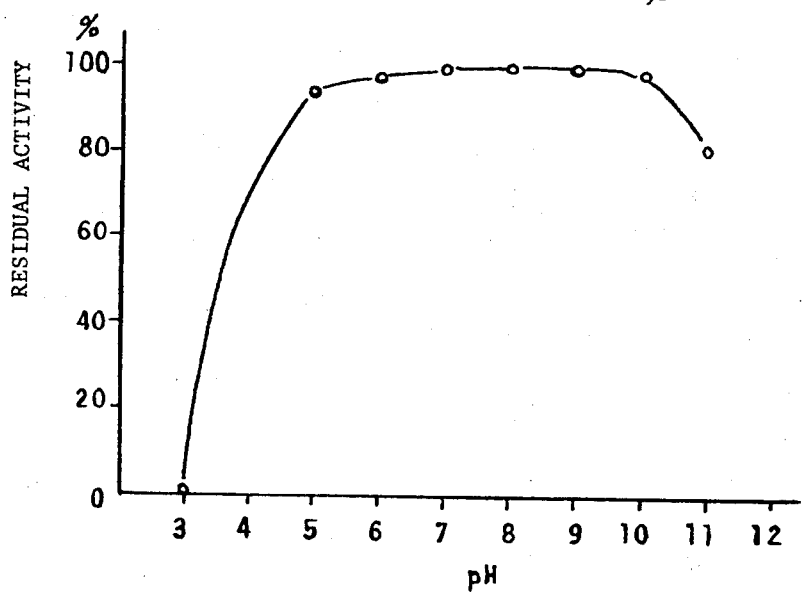
Fig. 4, pH STABILITY

3,737,383
PROCESS FOR PRODUCTION OF ENZYME ALKALINE DEXTRANASE
Jinnosuke Abe, Tagata-gun, Tetsuo Watanabe, Yokohama-shi, and Tsutomu Yamaguchi and Sinobu Gocho, Tagata-gun, Japan, assignors to Toyo Jozo Kabushiki Kaisha, Ohito-cho, Tagata-gun, Shizuoka-ken, Japan
Filed Feb. 22, 1971, Ser. No. 117,623
Claims priority, application Japan, Feb. 20, 1970, 45/15,057
Int. Cl. C12d 13/10
U.S. Cl. 195—62          5 Claims

ABSTRACT OF THE DISCLOSURE

A process for the production of enzyme alkaline dextranase, in which a microorganism of *Brevibacterium fuscum* var. *dextranlyticum* is cultivated in a culture medium containing a source of assimilable carbon and nitrogen, and the enzyme produced is then separated from the cultured medium. The enzyme alkaline dextranase thus produced is characterized by good stability and activity. A new microorganism is useful in this process, namely, *Brevibacterium fuscum* var. *dextranlyticum* NRRL B-3852 of the Northern Utilization Research and Development Division of the U.S. Department of Agriculture.

---

The present invention relates to the production of enzyme dextranase having optimum pH on the alkaline side (hereinafter designated as alkaline dextranase), by a novel method in which known microorganisms may be employed. The invention also relates to the enzyme alkaline dextranase of enhanced stability and activity particularly acting at alkaline pH which is thus produced, as well as a novel microorganism useful in the process.

Dextranase is an enzyme which splits the alpha-1,6 linkage of dextran.

It has been hitherto reported that there were a large number of dextranase-producing microorganisms such as fungi, for example, genus Aspergillus [refer to Science, 115, 43 (1952)], genus Pencillium [refer to Svensk. Kem. Tid., 60,283 (1948), Acta Chem. Scand., 3, 1405 (1949), J. Bacteriol., 64, 513 (1952), Japan. J. Agr. Chem. Soc., 28, 352 (1954) and Canad. J. Microbiol., 3, 239 (1957)], *Spicaria violaceae* [refer to J. Bacteriol., 64, 513 (1952)], genus Chethomium [refer to Summary of Congress of Japan. Agr. Chem. Soc., 1969, p. 115], bacteria, for example, genus Bacteroides [refer to J. Bacteriol., 63, 424 (1952) and ibid. 71, 373 (1956)], *Cellvibrio fulva* [refer to Acta Chem. Scand., 2, 803 (1948)], *Lactobacillus bifidus* [refer to Biochem. J., 72, 49 (1959)], genus Mitophaga or the like. However, no report was known of the production of dextranase by a genus Brevibacterium, and all of the dextranases referred to in the prior art were dextranases having strong activity at acidic pH and having almost no or only weak activity at alkaline pH.

Recently, there has been a great need to apply dextranase in the dental surgery field, and there is a demand for an enzyme which is stable and has optimum pH at neutral to alkaline pH for use in dentistry.

The inventors of the present invention have been investigating and screening alkaline dextranase-producing microorganisms, and have found that bacteria, separated from soil samples from Kakegawa-shi, Shizuoka-ken, Japan, produced strong and stable enzyme dextranase having optimum pH on the alkaline side.

It is a principal object of the present invention to provide a process for the production of stable and potent enzyme alkaline dextranase.

It is another object of the present invention to provide an industrially advantageous process for the production of the said alkaline dextranase by using a hitherto unknown microorganism as an alkaline dextranase producer.

Still another object of the present invention is the provision of enzyme alkaline dextranase produced by this process and characterized by enhanced stability and activity.

It is also an object of the present invention to provide a novel microorganism useful in this process.

These and other objects, features and advantages of the present invention will become more apparent to persons skilled in the art upon reading the more detailed description set forth hereinbelow, taken in connection with the accompanying drawing, in which:

FIG. 1 indicates the optimum pH of dextranase produced by the present invention;
FIG. 2 indicates the optimum temperature curve of the present dextranase;
FIG. 3 indicates the pH stability curve of the present dextranase; and
FIG. 4 indicates the heat stability curve of the dextranase of the instant invention.

The novel microorganism described herein has the following taxonomical properties:

(A) Growth Condition:
 (1) Microscopical observation—
  Size: 0.5–0.7 x 1.2–1.5 micron
  Form: short rod, no metamorphosis and branching or fragmentation.
  Motility: none
  Spore: no sporulation
 (2) Characteristics of colony—
  Surface: round, convex, lustrous and moist
  Color: yellow to yellowish orange pigment formed
 (3) Growth conditions in several media—
  Bouillon: good growth
  Bouillon agar medium: good growth
  Glucose bouillon agar medium: good growth
  Gelatin medium: growth
  Aqua peptone: growth
  Potato medium: growth
  Litmus milk: growth, the first acid formation and after alkaline formation.

(B) Physiological properties:
 (1) Optimum growth condition—
  pH: 7.0–8.0
  Temperature: 25° C.
  Aerobic or anaerobic: aerobic
 (2) Growth condition—
  pH: 5.5–10.0
  Temperature: 5–37° C.
  Aerobic or anaerobic: aerobic
 (3) Gram's stain: positive
 (4) Acid-fastness: —
 (5) Methyl red test: —
 (6) Voges-Proskauer's reaction: —
 (7) Indole formation: —
 (8) Hydrogen sulfate formation: —
 (9) Ammonia formation: —
 (10) Nitrate reduction: +
 (11) Catalase formation: +
 (12) Oxidase formation: —
 (13) Gelatin and casein liquefaction: +
 (14) Starch hydrolysis: +
 (15) Utilization of citrate: —
 (16) Coagulation of milk: —
 (17) Utilization of ammonium salt and urea: +

(C) Utilization of carbon sources:

| | |
|---|---|
| arabinose − | xylose + |
| glucose + | fructose + |
| lactose − | sucrose + |
| raffinose + | mannitol + |
| glycerol + | starch + |

Examining the taxonomical situation of the microorganism having the said taxonomical properties with reference to "Bergey's Manual of Determinative Bacteriology," 7th edition, in respect of positivity to Gram's stain, short rod shape, no metamorphosis, no branching, no sporulation, aerobic growth, negative anaerobic fermentation of glucose, negative aerobic fermentation of lactose, the said strain evidently belongs to the genus Brevibacterium.

Furthermore, this strain resembles *Brevibacterium fuscum* remarkably in taxonomical properties such characteristics as size of bacterium, immobility, yellowish orange pigment formation, nitrate reduction, gelatin liquefaction and non-formation of indole.

By comparison of the taxonomical properties of this *Brevibacterium fuscum* and those of the type culture *Brevibacterium fuscum* IFO 12127 obtained from the juridical foundation of Fermentation Institute, Osaka, Japan, this alkaline dextranase-producing strain is identified as a variety of bacterium *Brevibacterium fuscum* due to the non-production of dextranase of the type culture, and the acid formation positive for the present strain instead of negative for the type culture.

These two strains, however, resemble each other remarkably in many other taxonomical properties such as characteristics on many media and physiological properties. Therefore these strains are not strongly differentiated as different species of *Brevibacterium fuscum*. Accordingly, this alkaline dextranase-producing strain is herein referred to as *Brevibacterium fuscum* var. *dextranlyticum*, and has been deposited at the Institute for Microbiological Industry and Technology, Agency of Industrial Science & Technology, Ministry of International Trade & Industry, Japan, and added to its permanent culture collection, as a deposit number FERM-P 513. And further this strain has been deposited at the United States Department of Agriculture, Agricultural Research Service, Northern Utilization Research and Development Division, and added to its permanent culture collection, as a deposit number NRRL B-3852.

The above-described strain *Brevibacterium fuscum* var. *dextranlyticum* NRRL B-3852 is only illustrative as one of the microorganisms usable in this invention, and the present invention also contemplates the use of other alkaline dextranase-producing strains belonging to *Brevibacterium fuscum* var. *dextranlyticum*.

High productivity of alkaline dextranase by the said bacterium is achieved in accordance with known methods such as the usual methods of production of antibiotics or enzymes as, for example, selective treatment of strains by ultra violet, X-ray and mutagenic agent, and selection of media and fermentation condition suitable for the strain.

According to this invention, alkaline dextranase is produced by inoculating a suitable nutrient medium with *Brevibacterium fuscum* var. *dextranlyticum*.

Nutrient media which are useful for the production of alkaline dextranase may include an assimilable source of carbon such as glucose, sucrose, lactose, maltose, soluble, starch, starch, dextrin, dextran, molasses etc.; an assimilable source of nitrogen such as soybean powder, defatted soybean powder, cotton seed powder, peptone, meat extract, yeast extract, powdered dry yeast, corn steep liquor, ferma media, casein hydrolysate, urea, ammonium salt etc. The media further include salts such as phosphates, namely magnesium phosphate, calcium phosphate, potassium phosphate and the like.

Also various organic or inorganic materials useful for promoting microorganism growth or enzyme production may generally be added to the medium.

The inventors of the present invention have also found that alkaline dextranase production is increased when *Brevibacterium fuscum* var. *dextranlyticum* is cultured in a medium containing dextran and alcohol such as methanol and ethanol. Therefore this invention includes the process for the production of alkaline dextranase which comprises culturing *Brevibacterium fuscum* var. *dextranlyticum* in a medium containing dextran and alcohol.

Alcohol which may be added to the medium of this invention is lower aliphatic alcohol such as methanol and ethanol. These alcohols may be added in a suitable amount preferably about 0.5 to 2 percent by volume of the medium. Dextran may be suitably added to the medium of this invention at an amount preferably about 0.5 to 5 percent by volume of the medium.

The cultivation of the microorganism in this invention can be carried out in a number of different ways such as liquid culture or solid culture. The most profitable way for industrial production is a submerged aeration culture process.

For carrying out the culture of the organism for the production of alkaline dextranase by this invention, the culturing temperature may be selected generally in the range of temperature in which the alkaline dextranase-producing microorganism can grow and the alkaline dextranase can be produced, preferably at 20–30° C. and more preferably at 24–27° C.

The culturing period, although variable in accordance with the conditions employed, is generally 2 to 4 days; and at the time when the culture broth reaches maximum potency in alkaline dextranase, the cultivation should naturally be terminated.

It is unnecessary to control the pH of the medium as this remains almost constant; however, it is preferable to adjust to pH 8–9 at the time of medium preparation.

The isolation of alkaline dextranase from the cultured medium may be conducted according to the usual processes for the separation and purification of the enzyme dextranase. In case of liquid culture according to a preferred procedure employing vaccum filtration, centrifugation or the like prior processes, the beer is filtered to separate mycelia and obtain a filtrate.

To these extracts of filtrates with or without concentration, a soluble salt such as common salt, ammonium sulfate or the like, or a water-miscible organic solvent such as ethanol, acetone or the like is added to precipitate the alkaline dextranase. The precipitate is dissolved with water, then dialyzed with a semi-permeable membrane to remove low molecular impurities. Alternatively, the filtrate is treated by usual methods such as absorption chromatography, ion-exchange chromatography, gel-filtration or the like procedure to eliminate low molecular weight impurities or colored materials. In still further processes, concentration in vacuo, freeze drying, or the like may be employed to obtain crude alkaline dextranase.

The thus obtained crude solution or powder of alkaline dextranase is further purified by treating with the usual procedures for purification of proteins or enzymes such as absorption or gel-filtration treatment. For example, a solution of crude alkaline dextranase can be thus purified by gel-filtration and/or absorption with absorbent such as CM-cellulose or DEAE-cellulose, then dialyzed after being gradiently eluted.

These isolation and purification procedures may be alternatively or combinatively employed, thereby obtaining an enzyme powder having dextranase activity.

The thus obtained alkaline dextranase prepared by the process of this invention is extremely stable and active, and having an optimum pH on the alkaline pH side instead of the previously known acid dextranase. Therefore, the enzyme alkaline dextranase may be applied to a wide range of uses such as the dental surgery field, for example, dental paste additives for preventing caries of the teeth, the production of dextran for blood exchange and the like.

The alkaline dextranase obtained by the procedure of Example 5 hereinbelow has the following physico-chemical properties.

(1) *Elemental analysis* (percent): C, 35.9; H, 4.61; N, 6.70.
(2) Molecular weight: about 43,000 (determined by Biogel P-30 (product of Bio-Rad Laboratories, Calif., U.S.A.))
(3) Action: Exo-type splitting; randomly splitting the alpha-1,6-glucoside linkage in dextran, finally to form isomaltose. The dextranase activity is confirmed by viscosity measurement with the incubation mixture of the present enzyme and dextran, showing decrease of viscosity and increase of reducing sugar formation with time.
(4) Substrate specificity: Decomposes dextran, no activity against starch, dextrin, or the like polysaccharide having alpha-1,4-linkage.
(5) Optimum pH: about pH 8.0. Assay method; (a) Reducing sugar forming activity; Preparation: a mixture of enzyme solution 0.5 ml. (enzyme powder (50 units/mg.) is dissolved in distilled water to a concentration of 1 mg./ml.) and 1% solution of dextran 1 ml. in 0.05 mole acetate buffer (pH 5.0) or phosphate buffer (pH 6.0–7.5) or tris-buffer (pH 7.0–8.5) or borate buffer (pH 9.0–10.0) for adjusting each pH. Incubated at each pH, at 37° C. for 20 minutes and reducing sugar formed is assayed by the Dinitro Salicilic acid method for determination of activity. (b) Liquefaction activity: 5 ml. of 1% dextran solution in 0.05 mole buffer as described in method (a) hereinbefore is put in Ostwald's viscometer (8.3 sec. falling time of distilled water at 37° C.), and maintained at 37° C. 0.3 ml. of enzyme solution (4 mg./ml. of enzyme powder (50 units/mg.) in distilled water) is added thereto and falling time is recorded at one-minute intervals. Specific activity is calculated as follows:

$$\text{Specific activity} = \frac{t - t_o}{t_o}$$

wherein $t$ is falling time and $t_o$ is falling time of solvent. A value of $1/$(specific activity), i.e.

$$\frac{t_o}{t - t_o}$$

is plotted against pH to draw a linear graph. The dextranase activity is in proportion to that linear line so that the activity of dextranase can be assayed.

The relation of pH to activity is shown in FIG. 1.
(6) Optimum temperature: 0.5 ml. of enzyme solution containing 1 mg./ml. of enzyme powder (30 units/ml.) in 0.05 mole tris-buffer solution (pH 7.5) is added to 1 ml. of 1% dextran solution in 0.05 mole tris-buffer solution (pH 7.5), and incubated at 37° C., 45° C., 53° C. and 60° C., respectively, for 20 minutes. Activity is determined by formation of reducing sugar assayed by the Dinitro Salicilic acid method. The temperature-activity curve is shown in FIG. 2 which indicates that the optimum temperature of alkaline dextranase of the present invention is about 53° C.

(7) pH-stability: 0.5 ml. of enzyme solution containing 1 mg./ml. of the enzyme powder (30 units/mg.) in distilled water is mixed with 0.5 ml. of 0.05 mole acetate buffer solution (pH 5.0) or phosphate buffer solution (pH 6.0–7.5) or tris-buffer solution (pH 7.0–8.5) or borate buffer solution (pH 9.0–10.0). After incubation at 37° C. for 24 hours, the pH of each solution is adjusted to pH 7.5 with NaOH or HCl and diluted to five volumes by adding 0.05 mole tris-buffer solution (pH 8.0). The remaining enzyme activity of the enzyme solution is assayed by the dinitro salicilic acid method. The pH-stability curve is shown in FIG. 4, which indicates the remaining activity is more than 80% at pH 4.3–11.0 and 100% at pH 7–9.
(8) Heat-stability (temperature-stability): 0.5 ml. of enzyme solution containing 1 mg./ml. of the enzyme powder (30 units/mg.) in distilled water is maintained at 40° C., 50° C., 60° C., 63° C., 65° C., 68° C. and 70° C., respectively. After 10 minutes the mixture is cooled, 1 ml. of 0.05 mole tris-buffer solution (pH 7.5) containing 1% dextran is added, incubated at 37 C., for 20 minutes and then the remaining activity is determined by the dinitro salicilic acid method. The heat-stability curve is shown in FIG. 3, which indicates that the alkaline dextranase of the present invention is inactivated at 70° C. for 10 minutes and not inactivated below 57° C.
(9) Inhibition by metal ion: The enzyme of the present invention is inhibited by $Zn^{++}$, $Hg^{++}$ and $Cu^{++}$.
(10) Determination of potency: 0.5 ml. of enzyme solution is mixed with 1 ml. of 1% dextran (molecular weight 5,000,000–20,000,000) in 0.05 mole tris-buffer solution (pH 7.5). After incubation at 37° C. for 20 minutes, reducing sugar is assayed by the Dinitro Salicilic acid method, then the potency, as determined with reducing sugar corresponding to 1 mg./hour of maltose formation, is designated as 1 unit.

The inventors of the present invention found that the production of the alkaline dextranase by the present microorganism, *Brevibacterium fuscum* var. *dextranlyticum* NRRL B–3852, is remarkably increased by the addition of dextran and alcohol such as methanol and ethanol to the fermentation medium.

The following Table 1 illustrates the effect of organic solvent addition in fermentation media for alkaline dextranase production.

TABLE 1

| | Organic solvent | | | | | | | | | | | Control |
|---|---|---|---|---|---|---|---|---|---|---|---|---|
| | Ethanol | | Methanol | | Acetone | | Dioxan | | Chloroform | | Methyl isobutyl ketone | |
| Addition (percent) | 0.5 | 2 | 0.5 | 2 | 0.5 | 2 | 0.5 | 2 | 0.5 | 2 | 0.5 | 2 | 4 |
| Activity (unit/ml.) | 165 | 248 | 166 | 217 | 148 | 135 | 156 | 142 | 142 | 139 | 134 | 129 | 140 |
| Mycelial growth (turbidity) | 16.7 | 19.0 | 14.2 | 13.2 | 16.1 | 17.1 | 18.6 | 17.7 | 16.1 | 16.5 | 17.4 | 18.2 | 16.3 |
| pH of medium | 8.2 | 8.0 | 8.2 | 8.2 | 8.2 | 8.4 | 8.2 | 8.4 | 8.4 | 7.8 | 8.4 | 8.2 | 8.0 |

According to the data hereinabove, the production of alkaline dextranase is remarkably enhanced by addition of ethanol or methanol, especially by ethanol. Furthermore the effect of ethanol on dextranase production is illustrated in Table 2.

TABLE 2

| Ethanol concentration (percent) | 0 | 0.5 | 1 | 2 | 3 |
|---|---|---|---|---|---|
| Activity (unit/ml.), after 96 hours fermentation | 170 | 220 | 250 | 270 | 230 |

Medium used: dextran 1%, peptone 1%, $KH_2PO_4$ 0.1%, $K_2HPO_4$ 0.1%, $MgSO_4 \cdot 7H_2O$ 0.1%, $MnSO_4 \cdot 6H_2O$ 0.005%, $CaCl_2$ 0.002%, yeast extract 0.05%, pH 8.5. Ethanol is added after sterilization of the medium.

As stated above, the addition of dextran to the alkaline dextranase fermentation medium increases the enzyme production. The following Table 3 illustrates the effect of dextran and peptone.

TABLE 3

| Dextran added (percent) | Peptone added (percent) | Alkaline dextranase activity after 96 hours fermentation (unit/ml.) |
| --- | --- | --- |
| 0.5 | 0.5 | 85 |
| 1 | 1 | 170 |
| 2 | 2 | 260 |
| 3 | 3 | 250 |
| 4 | 4 | 240 |

The following examples illustrate the process of the present invention but are not to be construed as limiting.

EXAMPLE 1

Fifty milliliters of an aqueous medium (pH 8.5) consisting of dextran 2%, polypeptone 2%, yeast extract 0.05%, $KH_2PO_4$ 0.1%, $K_2HPO_4$ 0.1%, $MgSO_4 \cdot 7H_2O$ 0.1%, $MnSO_4 \cdot 6H_2O$ 0.005% and $CaCl_2$ 0.002% were introduced into a 500-milliliter Erlenmeyer flask, sterilized at 120° C. for 20 minutes, inoculated with 3% of pre-incubated *Brevibacterium fuscum* var. *dextranlyticum* NRRL B-3852 in the same medium and then cultured with reciprocatory shaking at 130 cycles/min., 7 centimeter stroke amplitude, at 26° C. for 60 hours, obtaining 450 ml. of cultured filtrate containing 200 units/ml. of dextranase, by combining the filtrate of 10 flasks. The filtrate was concentrated under reduced pressure at 40° C. to ⅓ volume, and half the volume of acetone was added thereto. After the precipitate was removed by centrifugation, 150% of the volume of acetone was added to the supernatant solution, then the precipitate was collected that was obtained by evaporating to 33 to 66% of the initial acetone concentration. The thus-obtained precipitate was dehydrated with acetone to yield 240 g. of enzyme powder after drying (yield 75%, by activity). The dextranase activity of this enzyme powder is 30 units/ml.

EXAMPLE 2

Example 1 was repeated, but dextran 0.5% and starch 0.5% in the aqueous medium was used, to obtain a fermentation liquor having 140 units/ml. of dextranase activity.

EXAMPLE 3

Example 1 was repeated, but potato starch residue in the amount 1% was added to the medium, to obtain a fermentation broth having 250 units/ml. of dextranase activity.

EXAMPLE 4

Twenty liters of aqueous medium (pH 8.5) consisting of dextran 1%, potato starch residue 1%, polypeptone 1%, yeast extract 0.05%, $KH_2PO_4$ 0.1%, $K_2HPO_4$ 0.1%, $MgSO_4 \cdot 7H_2O$ 0.1%, $MnSO_4 \cdot 6H_2O$ 0.005% and $CaCl_2$ 0.002% were introduced into a 30 l. jar fermenter, and sterilized at 120° C. for 30 minutes.

One liter of cultured medium of *Brevibacterium fuscum* var. *dextranlyticum* FERM P-513, which was cultured in the same medium at 26° C. for 20 hours, was inoculated thereinto, and cultured at 26° C. for 60 hours with aeration of 20 l./min., agitation of 300 r.p.m. After fermentation the mycelium was removed by centrifugation, to obtain 18.2 l. of cultured broth having dextranase activity of 220 units/ml.

Further, the cultured filtrate was concentrated under reduced pressure (evaporation rate 10 l./hour) to obtain 3.6 l. of the concentrate. To this concentrate, acetone was added and the precipitate formed at an acetone concentration of 33–66% and was fractionated thereafter. After dehydration with acetone, the precipitate was dried in vacuo to yield 96 g. of the enzyme powder. The thus-obtained enzyme powder had a dextranase activity of 32 units/mg.

EXAMPLE 5

Twenty liters of the fermented broth obtained by the same fermentation process as in Example 4 was introduced into 200 l. of sterilized aqueous medium consisting of dextran 1%, peptone 1.1%, $KH_2PO_4$ 0.1%, $K_2HPO_4$ 0.1%, $MgSO_4 \cdot 7H_2O$ 0.1%, $MnSO_4 \cdot 6H_2O$ 0.005%, $CaCl_2$ 0.002%, yeast extract 0.05% and ethanol 2%, pH 8.5, in a 250 l. stainless steel fermentation tank (100 ml. of antifoaming agent was added), and cultured at 30° C. for 48 hours with aeration of 50 l./min., agitation of 250 r.p.m. to obtain 170 l. of the cultured broth after twice centrifuging in a Sharples-type centrifuge.

The potency of the broth according to the assay method of Example 1 was 290 units/ml. (total activity: $4.93 \times 10^7$ units).

Further, this filtrate was concentrated to 47 l. under reduced pressure (total activity: $4.82 \times 10^7$ units, yield 98%, 1024 units/ml.). Acetone was added to the obtained concentrate up to 33% concentration which then stood overnight at room temperature, and the precipitated material was centrifuged off. To the clear supernatant solution, acetone was added up to 66% concentration, which then stood overnight at room temperature to obtain precipitated enzyme which was collected by decantation. The thus-obtained precipitate was washed with 5 l. of acetone and dried in vacuo to obtain 737 g. of the enzyme powder (50 units/mg., total activity: $3.65 \times 10^7$ units, activity recovery: 74%).

EXAMPLE 6

Fifty milliliters of an aqueous medium (pH 8.5) consisting of dextran 1%, polypeptone 1%, yeast extract 0.05%, $KH_2PO_4$ 0.1%, $K_2HPO_4$ 0.1%, $MgSO_4 \cdot 7H_2O$ 0.1%, $MnSO_4 \cdot 6H_2O$ 0.005% and $CaCl_2$ 0.002% were introduced into a 500-milliliter Erlenmeyer flask, sterilized at 120° C. for 20 minutes. After cooling the medium, ethanol was added at each concentration shown in the foregoing Table 2 and inoculated with *Brevibacterium fuscum* var. *dextranlyticum* NRRL B-3852, then incubated for 96 hours at 26° C. As indicated in Table 2 above, the activity of the medium was increased by the addition of ethanol.

EXAMPLE 7

Eighty grams of Bio-Gel P-30 (Product of Bio Rad Laboratories, California, U.S.A.) was packed into a column (inner diameter 3.2 cm.) after swelling with distilled water. One gram of the enzyme, obtained by the process of Example 1, dissolved in 10 ml. of distilled water was charged thereon, and eluted with distilled water. The eluate was fractionated at each 5 ml., and checked as to dextranase activity to show the dextranase activity at the fraction No. 33–42.

The said fraction was collected and freeze dried to obtain 63 mg. of alkaline dextranase powder (potency 455 units/mg., recovery 95.5%).

EXAMPLE 8

In Example 1, dextran was replaced by potato starch to obtain cultured filtrate containing alkaline dextranase (activity: 11 units/ml.).

EXAMPLE 9

In Example 1, dextran was replaced by maltose to obtain cultured filtrate containing alkaline dextranase activity of 10 units/ml.

Having described our invention, we claim:

1. A process for the production of enzyme alkaline dextrananse comprising culturing a microorganism of *Brevibacterium fuscum* var. *dextranlyticum* NRRL B-3852 in a culture medium containing a source of assimilable carbon and nitrogen, and separating the enzyme thus produced from the cultured medium.

2. A process as claimed in claim 1, in which the culture medium contains 0.5–3% by volume of ethanol.

3. A process as claimed in claim 1, and culturing the microorganism at 24–28° C. for 2–6 days.

4. A process as claimed in claim 1, in which said separation is effected by precipitation, absorption and elution.

5. An enzyme alkaline dextranase produced by the process of claim 1 and having the following properties:
   (1) elemental analysis: C, 35.9%; H, 4.61%; N, 6.70%
   (2) molecular weight: about 43,000
   (3) action: exo-type splitting; randomly splitting the alpha-1,6-glucoside linkage in dextran, finally to form isomaltose
   (4) substrate specificity: decomposes dextran, no activity against starch, dextrin, or the like polysaccharide having alpha-1,4-linkage
   (5) optimum pH: about pH 8.0
   (6) optimum temperature: about 53° C.
   (7) pH-stability: more than 80% at pH 4.3–11.0 and 100% at pH 7–9
   (8) heat-stability (temperature-stability): inactivated at 70° C. for 10 minutes and not inactivated below 57° C.
   (9) inhibition by metal ion: inhibited by $Zn^{++}$, $Hg^{++}$ and $Cu^{++}$.

References Cited
UNITED STATES PATENTS 3,622,661   11/1971   King et al. _____ 424—50

LIONEL M. SHAPIRO, Primary Examiner

U.S. Cl. X.R.

195—66 R; 424—50